Figure 2:
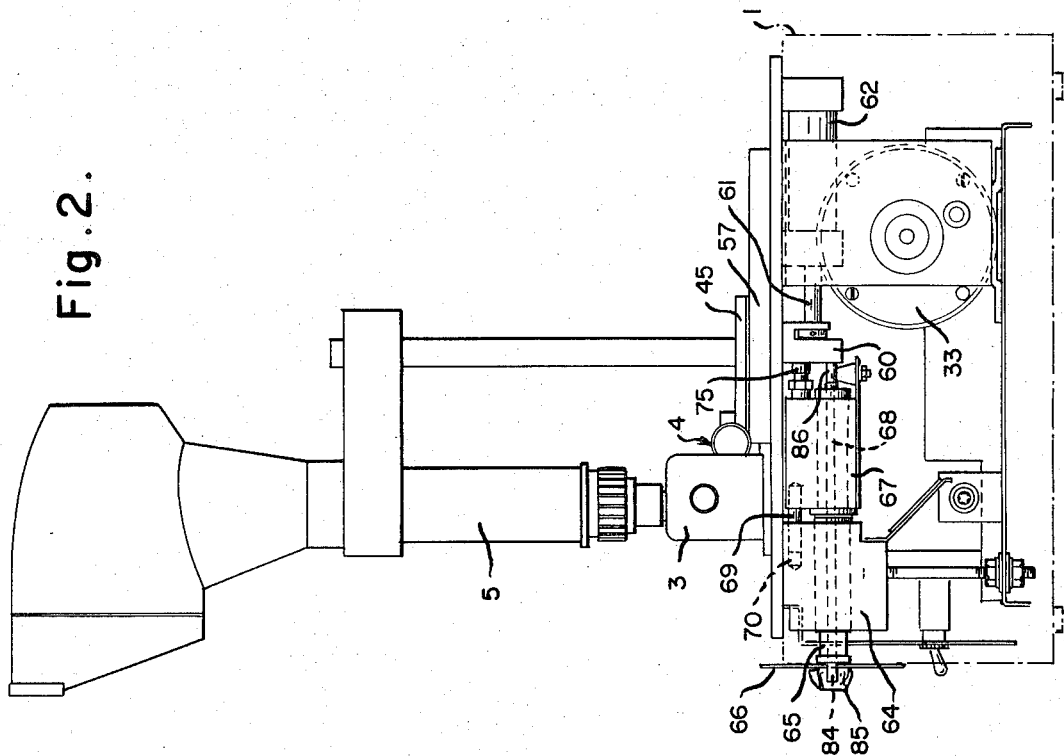

United States Patent [19]
Ianuzzi et al.

[11] 3,810,403
[45] May 14, 1974

[54] CONTACT LENS EDGING MACHINE

[75] Inventors: Joseph N. Ianuzzi, Binghamton; Gordon Hurlbut, Windsor, both of N.Y.

[73] Assignee: Union Electronics (a Division of The Union Corporation), Windsor, N.Y.

[22] Filed: Aug. 9, 1972

[21] Appl. No.: 278,940

[52] U.S. Cl. .............. 82/1 C, 82/11, 51/217 L, 51/284
[51] Int. Cl. ............................................. B23b 1/00
[58] Field of Search ................ 82/11, 18, 14, 1 C; 51/217 L, 284

[56] References Cited
UNITED STATES PATENTS

| 3,528,326 | 9/1970 | Kilmer et al. | 82/14 R |
| 3,722,143 | 3/1973 | Cottom | 51/217 L |
| 2,395,376 | 2/1946 | Long | 82/18 X |
| 2,922,328 | 1/1960 | Vaida et al. | 82/24 |
| 2,563,918 | 7/1951 | Casella et al. | 82/24 |

Primary Examiner—Leonidas Vlachos
Attorney, Agent, or Firm—Buell, Blenko & Ziesenheim

[57] ABSTRACT

A contact lens is edged by holding it against a rotating faceplate by suction and moving a cutting tool against it at a controlled rate of travel below that which would dislodge the lens from the faceplate. Suitable apparatus is disclosed.

8 Claims, 6 Drawing Figures

CONTACT LENS EDGING MACHINE

This invention relates to apparatus and method for edging contact lenses. It is more particularly concerned with apparatus and method for readily locating and holding a lens in edging position and automatically edging it.

Contact lenses are concave out on the side contiguous to the eyeball and convex out on the other side. Hereinafter these sides or faces will be identified as concave and convex, respectively. These surfaces are of different radii and the contour of the edge of the lens where these surfaces meet is critical to the comfort to the wearer. Lenses require individual edging, which is accomplished in lathe type machines.

As contact lenses are only a few millimeters in diameter and have even less thickness, they cannot be held for edging in conventional chucks or like devices. One expedient known to the prior art is that of affixing the lens by wax or some similar substance to a holder which in turn can be gripped by a chuck. Such an arrangement is disclosed in U.S. Pat. No. 3,301,105, issued to B. R. Morris on Jan. 31, 1967. This procedure by its nature is time consuming and may scratch the lens surface. Another expedient is that of holding a lens at its center by pressure between small diameter headstock and tailstock spindles, as is disclosed in U.S. Pat. No. 3,160,039, issued to P. M. Rocher et al. on Dec. 8, 1964. This procedure may damage the center of the lens, and the pressure of the tool against the unsupported edge of the lens causes the latter to deflect so that the edging operation becomes a cut and try procedure. Because of this an optical system is often used which projects a magnified view of the lens edge and the tool on a screen positioned before the operator, as is also disclosed in the Morris patent above mentioned. Results depend to a considerable degree on the operator's skill and experience.

It is an object of our invention to provide apparatus and method for edging contact lenses which are independent of the skill of the operator. It is another object to provide apparatus and method for edging contact lenses which cannot damage the surface of the lenses. Other objects of our invention will become evident in the course of the description thereof which follows.

We have discovered that a contact lens can be positioned on a faceplate by negative air pressure, or suction, and be held there for edging by the same means so that it is supported over its entire area without damage to its surface. We have invented apparatus for this purpose. We have also invented apparatus and method for automatically bringing a preset edging tool against the edge of a lens so supported at a predetermined speed so as to edge the lens to a predetermined contour without dislodging it from the faceplate. Our apparatus and process are independent of the manipulative skill of the operator.

An embodiment of the apparatus of our invention presently preferred by us is illustrated in the attached figures to which reference is now made.

Figure 1:
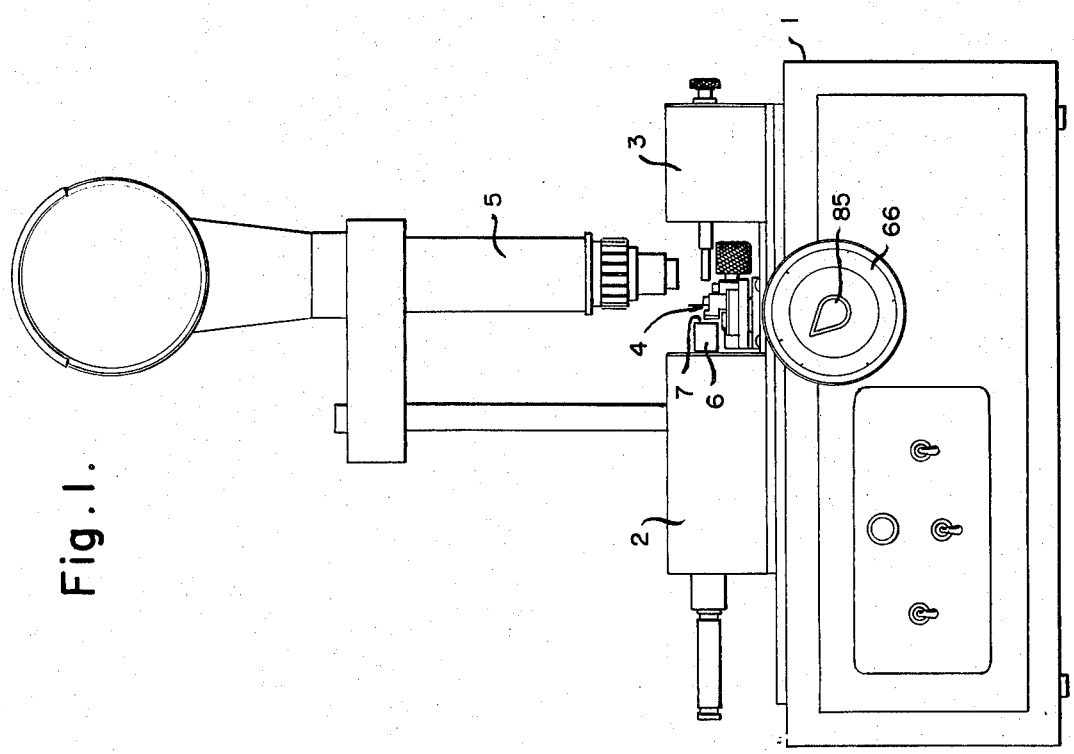
Figure 3:
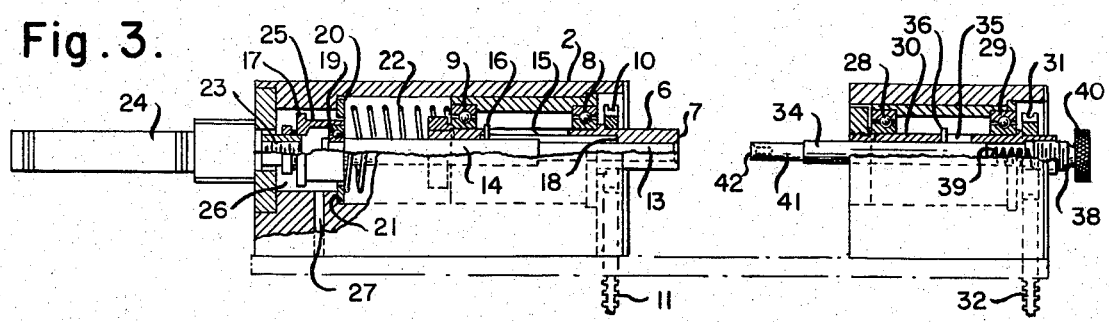
Figure 4:
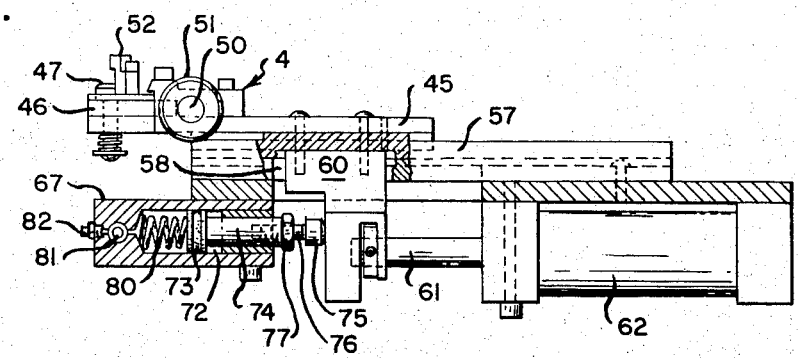
Figure 5:
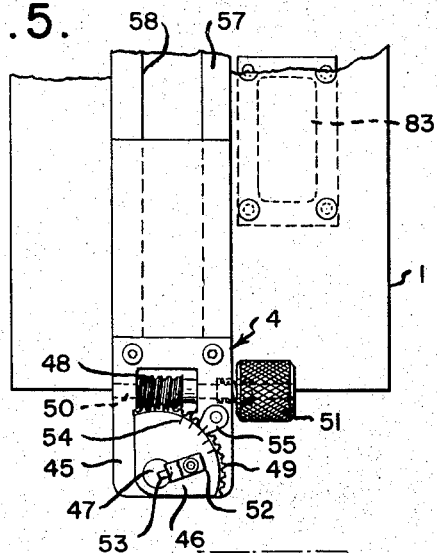
Figure 6:
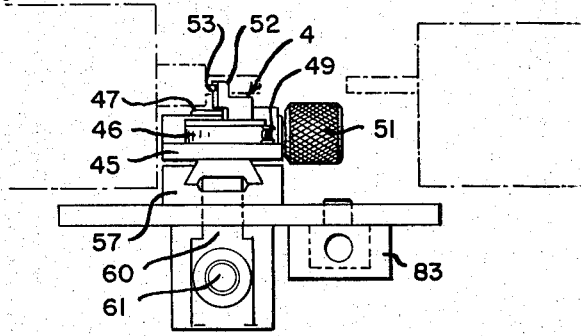

FIG. 1 is a front elevation of our apparatus;
FIG. 2 is an end elevation of our apparatus;
FIG. 3 is a detail of our spindle mechanism;
FIG. 4 is a detail of our tool positioning means;
FIG. 5 is a plan view of our tool mounting means; and
FIG. 6 is an elevation of the apparatus of FIG. 5.

Our apparatus is mounted on a flat generally rectangular base or frame 1. Its principal components are a headstock 2, a tailstock 3 and a tool slide 4. Our apparatus is also provided with a conventional optical profile projector 5 for observance of the work, but, as will appear, the operation of our apparatus is not in any way dependent on the use of this projector.

Headstock 2 journals a horizontally disposed hollow outer spindle 6 having an outer end 7 which faces tailstock 3. This outer end 7 we denominate a faceplate because the lens is mounted thereon in a manner to be described. Spindle 6, however, is greater in diameter than a lens and faceplate 7 need be no more than the end of spindle 6. That spindle rotates in spaced apart bearings 8 and 9 in headstock 2, the former being closer to faceplate 7 than the latter. A pulley 10 is fitted to spindle 6 adjacent bearing 8 and a drive belt 11 is trained around pulley 10 and a mating pulley on a drive shaft, not shown, driven by a motor, not shown, positioned below spindle 6 in base 1.

Coaxial with hollow outer spindle 6 and freely rotatable therein is an inner hollow spindle 13, the outer diameter of which is smaller than the diameter of a lens. Inner spindle 13 is capable of being retracted entirely within outer spindle 6 or extended so that one end projects beyond faceplate 7, as will be described. In FIG. 3 inner spindle 13 is shown in its fully retracted position. Inner spindle 13 has an enlarged diameter portion 14 which is movable longitudinally within spindle 6 but rotates with it. To this end spindle 6 is provided with a longitudinal slot 15 in its wall intermediate bearings 8 and 9, and spindle 14 is provided with a radially projecting pin 16 which extends into slot 15. The bore of spindle 6 from its inner end is large enough to accommodate spindle portion 14 up to a shoulder 18 near faceplate 7. From shoulder 18 to faceplate 7 the bore of spindle 6 is only large enough to accommodate inner spindle 13.

Spindle portion 14 extends into cavity 26 within headstock 2 beyond the inner end of spindle 6. That end of spindle 14 is fitted with an anti-friction bearing 19 carrying an annular sleeve 25, which in turn carries a larger diameter washer 20. Between washer 20 and bearing 9 of spindle 6 is positioned a helical compression spring 22 which urges washer 20 against an inner shoulder 21 in cavity 26. Slidably within washer 20 and extending axially therefrom away from spring 22 is annular sleeve 25 previously mentioned which in turn is attached to piston rod 23 of an air cylinder 24 which is co-axial with spindles 6, 13 and 14. A collar 17 extends radially outwardly from sleeve 25 at the end connected to rod 23. This collar engages washer 20 as the sleeve 25 is moved toward the faceplate 7. An air line and valve, not shown, carries compressed air to either end of air cylinder 24 as required from a source of air under pressure, not shown. A vacuum pump, also not shown, is connected to cavity 26 through bore 27 in headstock 2. Cavity 26 has access to the inner ends of hollow shafts 14 and 6 through openings in collar 25, but is otherwise air tight.

Tailstock 3 houses a pair of spaced apart anti-friction bearings 28 and 29, the former being adjacent to the end of tailstock 3 opposite headstock 2. A hollow spindle 30 is journalled in bearings 28 and 29 is provided with a pulley 31. A drive belt 32 is trained around pulley 31 and a drive pulley, not shown, of a drive motor 33 within base 1. Within hollow spindle 30 is positioned spindle 34 coaxial therewith. The wall of spindle 30 intermediate bearings 28 and 29 is provided with a longitudinal slot 35 and spindle 34 carries a pin 36 which extends radially into slot 35, thereby causing spindle 34 to rotate with spindle 30 but allowing it to move axially therewithin. Into the end of spindle 30 remote from headstock 2 is threaded a sleeve 38 provided with a knurled knob 40. A helical compression spring 39 is fitted within spindle 30 between sleeve 38 and the inner end of spindle 34, so as to urge spindle 34 toward headstock 2. The outer end 41 of spindle 34 is countersunk at 42 so as to mate with the convex surface of a contact lens, and is preferably covered with felt or similar soft material.

Tool slide 4 is shown in detail in FIGS. 4, 5 and 6. A plate 45 carries a sector 46 mounted to rotate about a pivot 47 fixed to plate 45. A worm gear 48 carried by shaft 50 journalled horizontally on plate 45 meshes with teeth 49 cut around the arcuate edge of sector 46, and shaft 50 is turned manually by a knurled knob 51. A tool holder 52 holding a cutting tool 53 is fastened to sector 46. The arcuate edge of sector 46 is marked off in a scale of angles 54, and an index 55 therefor is affixed to plate 45.

Plate 45 is dovetailed into underlying cross-member 57 which is affixed to base 1 so as to slide on member 57 crosswise of base 1 and faceplate 7. Cross-member 57 is formed with a slot 58 extending longitudinally of member 57 but crosswise of base 1. An arm 60 is fastened to the bottom of plate 45 and extends downwardly through slot 58 and below it, as is best seen in FIG. 4. Arm 60 at its lower end is connected to the end of piston rod 61 of air cylinder 62 which is mounted on base 1 with its axis crosswise thereof. The two ends of cylinder 62 are connected through air lines, not shown, and a valve, not shown, to a source of air under pressure, also not shown, so that air cylinder 62 moves plate 45 crosswise of faceplate 7, as may be required.

The tool slide retarding means and stop means are shown in FIGS. 2 and 4. Attached to base 1 below its top surface is a housing 64 in which a hollow shaft 65 is journalled crosswise of base 1 for rotation. One end of hollow shaft 65 projects beyond the front surface of base 1 and carries a dial 66. The other end 68 extends beyond the end of housing 64 into and through a housing 67, the bore of which is threaded. End 68 of shaft 65 is also threaded in like manner. The face of housing 67 adjacent housing 64 is provided with an outwardly projecting pin 69 which slides in a hole 70 in housing 64. Rotation of shaft 65 thus causes housing 67 to move toward or away from housing 64 crosswise of base 1.

Housing 67 also contains a blind cylindrical bore 72 which is disposed parallel to shaft 65. This is best seen in FIG. 4. A piston 73 is fitted within bore 72 attached to a piston rod 74, upon the outer end of which is mounted an adjustable stop 75. Stop 75 has a threaded shank 76 which is screwed into a threaded hole in piston rod 74 and is provided with a jam nut 77. Stop 75 is located so that it is in the path of travel of arm 60. Within bore 72 between piston 73 and the end of the bore is a helical compression spring 80. The blind end of bore 72 communicates through a metering valve 81 with a connector 82, which, through a conduit not shown, is connected to an oil reservior 83 within base 1. This reservoir is indicated in FIGS. 5 and 6.

Coaxial with hollow shaft 65 is an inner shaft 84, one end of which extends outwardly through dial 66 and terminates in a knob 85. Shaft 84 is threaded into hollow shaft 65, and extends throughout the length of that shaft and beyond it as outer end 86. Outer end 86 is also located so that it is in the path of travel of arm 60.

The method of our invention and the operation of our apparatus will be described in the context of the apparatus above disclosed. The edging of a lens is commenced by applying negative pressure or suction to outer spindle 6 and inner spindle 13 of headstock 2; thus air is sucked in through the open ends of those spindles which face tailstock 3. By admitting air under pressure to the outer end of cylinder 24 the open outer end of spindle 13 is made to project beyond the outer end of spindle 6. A lens is then placed upon the outer end of spindle 13, the concave face of the lens being contiguous to the spindle end. The pressure of air on the convex face holds the lens in place. Spindles 6 and 13 are rotated and the operator centers the lens on spindle 13 by holding his finger against the lens edge. Spindle 13 is then retracted into spindle 6 by admitting air to the inner end of air cylinder 24. This brings the lens against faceplate 7 where it is held by the pressure of the atmosphere on its convex surface. If desired, faceplate 7 may be covered with rubber or some like material which enhances the seal between the lens and the faceplate and the friction between them.

The angle of the cutting tool 53 has been previously set by turning knurled knob 51. This angle is a function of the lens diameter and the prescribed edge contour and is determined from a chart. Dial 66, which is calibrated in diameters, is set to the prescribed lens diameter. Rotation of dial 66 turns hollow shaft 65 and moves housing 67 toward or away from housing 64, which is fixed. Movement of housing 67 also moves check stop 75 and end 86 of shaft 84 toward or away from arm 60. Knob 85, which is calibrated in edge thickness units, is turned to the prescribed value of edge thickness. This knob rotates shaft 84 in hollow shaft 65 causing outer end 86 of shaft 84 to vary its position with respect to check stop 75. End 86, however, is always farther away from arm 60 than is check stop 75.

When the tool 53 is in its retracted position with respect to faceplate 7, bore 72 of housing 67 is full of oil, as will be explained. Edging of the lens is accomplished by admitting air to the other end of air cylinder 62. This causes piston rod 61 to move toward faceplate 7 carrying arm 60 and plate 45 with it. The speed of this movement depends on the pressure of the air admitted to cylinder 62, which pressure may vary, and in any case the movement is so fast that tool 53 would dislodge the lens from faceplate 7 before edging was completed. To prevent this, check stop 75 is positioned so that it is engaged by arm 60 before tool 53 engages the lens. When arm 60 makes contact with check stop 75 it forces that stop backwards and so forces piston 73 into bore 72. This movement is resisted by compression spring 80 and the oil in bore 72. The oil is forced out of bore 72 through metering valve 81, which is adjusted to reduce the velocity of movement of tool 53 to the desired value. The oil passing through metering valve 81 flows back through connector 82 and the conduit not shown to oil reservoir 83. The extent of travel of tool 53 is limited by the position of shaft end 86 which stops further movement of arm 60 when it is engaged by that arm. The tool is then backed off by admitting air to the other end of air cylinder 62. When arm 60 backs away, spring 80 forces piston 73 outwardly and the suction thus set up in bore 72 draws oil from reservoir 83, which is open to the atmosphere, back into bore 72. To facilitate this, metering valve 81 is constructed so as to meter the oil flow in the working direction only, and not to restrict back flow.

It will be evident that our cutting tool 53 which is advanced normal to the axis of the lens must have a straight cutting edge, and so leaves sharp or unrelieved edges, or corners in profile, where the cutting edge meets the original surface of the lens. These edges or corners are rounded off by polishing. For this operation inner spindle 13 of headstock 2 is advanced, lifting the lens off faceplate 7 and moving it towards tailstock 3 until its convex surface makes contact with end 42 of tailstock spindle 41. As has been mentioned this spindle is urged toward headstock 2 by spring 39, and spindle 13 is advanced sufficiently to compress spring 39 slightly, thus holding the lens between the two spindles by its center portion. In this position it is rotated while the operator polishes its sharp edges by applying a polishing compound thereto with a swab.

It will be noted from the foregoing description that the headstock spindle 6 and tailstock spindle 30 are synchronized by means of the timing belt drive on both. This is important because without synchronous spindles it is impossible to shift the lens through its three positions without lens slippage. If the lens slips there is a resultant possibility of scratching of the lens faces.

In the foregoing specification we have described a presently preferred embodiment of our invention, however, it will be understood that this invention can be otherwise embodied within the scope of the following claims.

We claim:

1. Lathe type apparatus for edging contact lenses comprising a headstock mounted on a frame, a hollow spindle mounted for rotation in the headstock and having a faceplate end, means for rotating the spindle, means connected with the spindle for creating suction at the faceplate end thereof, a tool holder adjustably positioned with respect to the headstock to hold a tool against the outer face of a contact lens mounted on the faceplate, a hollow inner spindle mounted for rotation in the spindle coaxial therewith, means for rotating the inner spindle, means for moving the inner spindle axially with respect to the spindle from a position in which an end of the inner spindle projects beyond the faceplate end of the spindle to a position in which that end of inner spindle is retracted within the spindle, and means connected with the inner spindle for creating suction at the faceplate end thereof.

2. Apparatus of claim 1 including fluid operated means for moving the tool holder crosswise of the faceplate, fluid operated retarding means positioned to be engaged by the tool holder and reduce its velocity, and adjustable stop means therefor.

3. Apparatus of claim 2 in which the retarding means comprise a cylinder, a piston movable therein, a check stop adapted to be engaged by the tool holder mounted on the piston, a fluid reservoir, fluid conduit means between the reservoir and the cylinder, and a metering valve in those conduit means.

4. Apparatus of claim 3 including means for moving the cylinder crosswise of the faceplate so as to adjust the position of the check stop.

5. Apparatus of claim 4 in which the means for moving the cylinder comprise a hollow shaft journaled in the frame and having a theaded end mating with a nut attached to the cylinder and the adjustable stop means comprise an inner shaft coaxial with the hollow shaft having an end projecting beyond the cylinder but short of the check stop, the inner shaft being threaded into the hollow shaft.

6. Apparatus of claim 1 having a tailstock spaced from said headstock and synchronized with said headstock through a timing belt drive on both.

7. The method of edging a contact lens blank to provide a contact lens comprising positioning the concave face of the blank against the end of a rotating hollow spindle coaxial with and spaced from and intermediate a spaced tailstock and a rotating faceplate, applying suction to the blank through the hollow spindle so as to hold the blank in place thereon, centering the blank on the end of said spindle, retracting the spindle into the faceplate so as to position the blank concentrically thereto, applying suction to the blank at said face plate, and bringing an edging tool into contact with the convex face of the blank and edging it while it is held in place on the faceplate by suction.

8. The method of edging a contact lens as claimed in claim 7 including the steps of withdrawing the edging tool from the blank, advancing both the hollow spindle and the tailstock until the blank is held between them spaced from the faceplate, rotating the blank between the tailstock and hollow spindle and forming a radius on the edge thereof.

* * * * *

UNITED STATES PATENT OFFICE
CERTIFICATE OF CORRECTION

Patent No. 3,810,403    Dated May 14, 1974

Inventor(s) Joseph N. Ianuzzi and Gordon Hurlbut

It is certified that error appears in the above-identified patent and that said Letters Patent are hereby corrected as shown below:

Under the heading "UNITED STATES PATENTS", Reference Patent No. 2,563,918, issued 7/1951, should read --8/1951--.

Signed and sealed this 24th day of September 1974.

(SEAL)
Attest:

McCOY M. GIBSON JR.
Attesting Officer

C. MARSHALL DANN
Commissioner of Patents